(12) United States Patent
Hadzic et al.

(10) Patent No.: US 8,693,608 B2
(45) Date of Patent: Apr. 8, 2014

(54) FREQUENCY SYNCHRONIZATION USING CLOCK RECOVERY LOOP WITH ADAPTIVE PACKET FILTERING

(75) Inventors: Ilija Hadzic, Millington, NJ (US); Dennis R. Morgan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 463 days.

(21) Appl. No.: 12/885,958

(22) Filed: Sep. 20, 2010

(65) Prior Publication Data

US 2012/0069944 A1   Mar. 22, 2012

(51) Int. Cl.
*H03D 3/24* (2006.01)

(52) U.S. Cl.
USPC .......................................... 375/376; 375/350

(58) Field of Classification Search
USPC ........................................................ 375/376
See application file for complete search history.

(56) References Cited

U.S. PATENT DOCUMENTS

| | | | | |
|---|---|---|---|---|
| 7,571,359 | B2 * | 8/2009 | Gutnik et al. ................. | 714/700 |
| 2005/0058235 | A1 * | 3/2005 | Beeson et al. ................ | 375/376 |
| 2006/0222129 | A1 | 10/2006 | Hadzic et al. | |
| 2007/0097947 | A1 * | 5/2007 | Aweya et al. ................. | 370/350 |
| 2010/0158051 | A1 | 6/2010 | Hadzic et al. | |
| 2010/0158181 | A1 | 6/2010 | Hadzic | |
| 2010/0158183 | A1 | 6/2010 | Hadzic et al. | |
| 2010/0329125 | A1 * | 12/2010 | Roberts et al. ............. | 370/241.1 |
| 2011/0204937 | A1 * | 8/2011 | Demirkan .................... | 327/157 |

OTHER PUBLICATIONS

MEF8, "Implementation Agreement for the Emulation of PDH Circuits over Metro Ethernet Networks," Metro Ethernet Forum, Oct. 2004, 34 pages.
A. Vainshtein et al., "Structure-Agnostic Time Division Multiplexing (TDM) Over Packet (SAToP)," IETF RFC 4553, Jun. 2006, pp. 1-27.
R.C. Lau et al., "Synchronous Techniques for Timing Recovery in BISDN," IEEE Transactions on Communications, Feb.-Mar.-Apr. 1995, pp. 1810-1818, vol. 43, No. 2-3-4.
David L. Mills, "Network Time Protocol (Version 3) Specification, Implementation and Analysis," IETF RFC 1305, Mar. 1992, 120 pages.
I. Hadzic et al., "High Performance Synchronization for Circuit Emulation in an Ethernet MAN," Journal of Communications and Networks, Mar. 2005, pp. 1-12, vol. 7, No. 1.

(Continued)

*Primary Examiner* — Leon-Viet Nguyen
(74) *Attorney, Agent, or Firm* — Ryan, Mason & Lewis, LLP (57) ABSTRACT

An endpoint or other communication device of a communication system includes a clock recovery loop having a phase error estimator. The communication device is operative as a slave device relative to another communication device that is operative as a master device. The clock recovery loop is configured to control a slave clock of the slave device responsive to a phase error estimate generated by the phase error estimator so as to synchronize the slave clock with a master clock of the master device. The phase error estimator comprises a plurality of filters each configured to generate a different estimate of master clock phase using at least a subset of a plurality of packets received from the master device, and control logic for adaptively selecting at least a particular one of the plurality of filters for use in generating the phase error estimate to be processed in the clock recovery loop.

23 Claims, 6 Drawing Sheets

(56) References Cited

OTHER PUBLICATIONS

ITU-T G.8261, "Timing and Synchronization Aspects in Packet Networks," International Telecommunication Union (ITU), Telecommunication Standardization Sector, May 2006, 64 pages.

J. Kim et al., "Design of CMOS Adaptive-Bandwidth PLL/DLLs: A General Approach," IEEE Transactions on Circuits and Systems II: Analog and Digital Signal Processing, Nov. 2003, pp. 860-869, vol. 50, No. 11.

ITU-T G.823, "The Control of Jitter and Wander within Digital Networks which are Based on the 2048 kbit/s Hierarchy," International Telecommunication Union (ITU), Telecommunication Standardization Sector, Mar. 2000, 50 pages.

ITU-T G.824, "The Control of Jitter and Wander within Digital Networks which are Based on the 1544 kbit/s Hierarchy," International Telecommunication Union (ITU), Telecommunication Standardization Sector, Mar. 2000, 27 pages.

David L. Mills, "Internet Time Synchronization: The Network Time Protocol," IEEE Transactions on Communications, Oct. 1991, pp. 1482-1493, vol. 39, No. 10.

Ravi Subrahmanyan, "Implementation Considerations for IEEE 1588v2 Applications in Telecommunications," International IEEE Symposium on Precision Clock Synchronization (ISPCS) for Measurement, Control and Communication, Oct. 2007, pp. 148-154.

J.C. Eidson et al., "Sharing a Common Sense of Time," IEEE Instrumentation & Measurement Magazine, Mar. 2003, pp. 26-32, vol. 6, No. 1.

J. Ridoux et al., "Ten Microseconds Over LAN, for Free," International IEEE Symposium on Precision Clock Synchronization (ISPCS) for Measurement, Control and Communication, Oct. 2007, pp. 105-109.

I. Hadzic et al., "On Packet Selection Criteria for Clock Recovery," International IEEE Symposium on Precision Clock Synchronization (ISPCS) for Measurement, Control and Communication, Oct. 2009, pp. 35-40.

"Timing and Synchronization Aspects in Packet Networks," International Telecommunication Union (ITU), Telecommunications Standardization Sector, ITU-T Recommendation G.8261/Y.1361, Apr. 2008, 112 pages.

B. Mochizuki et al., "Improving IEEE 1588v2 Clock Performance Through Controlled Packet Departures," IEEE Communications Letters, May 2010, pp. 459-461, vol. 14, No. 5.

* cited by examiner

```
case state of
sample_min :
    if v_min[k]/v_mean[k] > T then
        mean_vote ← mean_vote + 1
    else
        mean_vote ← 0
    if v_min[k]/v_max[k] > T then
        max_vote ← max_vote + 1
    else
        max_vote ← 0
    if mean_vote > H then
        min_vote, mean_vote, max_vote ← 0
        state ← sample_mean
    else if max_vote > H then
        min_vote, mean_vote, max_vote ← 0
        state ← sample_max
sample_mean :
    if v_mean[k]/v_min[k] > T then
        min_vote ← min_vote + 1
    else
        min_vote ← 0
    if v_mean[k]/v_max[k] > T then
        max_vote ← max_vote + 1
    else
        max_vote ← 0
    if min_vote > H then
        min_vote, mean_vote, max_vote ← 0
        state ← sample_min
    else if max_vote > H then
        min_vote, mean_vote, max_vote ← 0
        state ← sample_max
sample_max :
    if v_max[k]/v_mean[k] > T then
        mean_vote ← mean_vote + 1
    else
        mean_vote ← 0
    if v_max[k]/v_min[k] > T then
        min_vote ← min_vote + 1
    else
        min_vote ← 0
    if mean_vote > H then
        min_vote, mean_vote, max_vote ← 0
        state ← sample_mean
    else if min_vote > H then
        min_vote, mean_vote, max_vote ← 0
        state ← sample_min
```

FREQUENCY SYNCHRONIZATION USING CLOCK RECOVERY LOOP WITH ADAPTIVE PACKET FILTERING

FIELD OF THE INVENTION

The present invention relates generally to packet-based communication systems, and more particularly to techniques for providing frequency synchronization between communication devices of such systems.

BACKGROUND OF THE INVENTION

Synchronization in a packet-based communication system is typically achieved by exchanging timestamped packets between a master device and a slave device, both of which may be located at the edges of a packet network. The slave device typically implements a clock recovery algorithm that processes the timestamps to yield a signal that is used to control a local oscillator in the slave device.

Examples of known synchronization techniques of this type are disclosed in U.S. Patent Application Publication No. 2010/0158051, entitled "Method, Apparatus and System for Frequency Synchronization between Devices Communicating over a Packet Network," Publication No. 2010/0158183, entitled "Frequency Synchronization Using First and Second Frequency Error Estimators," and Publication No. 2010/0158181, entitled "Frequency Synchronization with Compensation of Phase Error Accumulation Responsive to a Detected Discontinuity," all of which are commonly assigned herewith and incorporated by reference herein.

Packet delay variation (PDV) is a dominant source of noise in such packet-based communication systems. To filter this type of noise, many clock recovery algorithms select packets for processing based on a sample-minimum statistic of the network transit time. More specifically, a clock recovery algorithm typically groups arriving packets in non-overlapping windows and, for each window, selects the packet that had the shortest transit time through the network, with all other packets in the window being discarded. This operation corresponds to selectively downsampling the phase error signal by sample-minimum filtering. Although such sample-minimum filtering can be very effective in certain types of packet networks, there are many other networks and background traffic patterns for which sample-minimum filtering is far from optimal.

SUMMARY OF THE INVENTION

Illustrative embodiments of the present invention provide improved techniques for frequency synchronization between communication devices by configuring a clock recovery loop to include a phase error estimator which adaptively selects from a number of different types of packet filters based on variance measures of respective phase error estimates generated using those packet filters, in order to minimize phase noise under varying traffic patterns and other network conditions.

In accordance with one aspect of the invention, an endpoint or other communication device of a communication system includes a clock recovery module having a phase error estimator. The communication device is operative as a slave device relative to another communication device that is operative as a master device. The clock recovery loop is configured to control a slave clock of the slave device responsive to a phase error estimate generated by the phase error estimator so as to synchronize the slave clock with a master clock of the master device. The phase error estimator comprises a plurality of filters each configured to generate a different estimate of master clock phase using at least a subset of a plurality of packets received from the master device, and control logic for adaptively selecting at least a particular one of the plurality of filters for use in generating the phase error estimate to be processed in the clock recovery loop.

In one of the illustrative embodiments, a given one of the master clock phase estimates is determined based on measured master-to-slave delays associated with respective ones of the received packets in the corresponding subset. The measured master-to-slave delay associated with a particular one of the received packets may be computed based on a difference between an arrival timestamp generated in the slave device and a corresponding departure timestamp generated in the master device, wherein the departure timestamp is communicated from the master device to the slave device in the particular received packet. The master timestamps are generated with reference to the master clock, while the slave timestamps are generated with reference to the slave clock. The slave clock is controlled based on calculations performed by the slave using the master and slave timestamps.

In another one of the illustrative embodiments, a given one of the master clock phase estimates is determined based on measured slave-to-master delays associated with respective ones of the received packets in the corresponding subset. The measured slave-to-master delay associated with a particular one of the received packets may be computed based on a difference between a departure timestamp generated in the slave device and a corresponding arrival timestamp generated in the master device, wherein the arrival timestamp is communicated from the master device to the slave device in the particular received packet.

The plurality of adaptively selectable filters in one or more of the illustrative embodiments may comprise a sample-minimum filter configured to generate an estimate of the master clock phase utilizing selected packets each of which exhibits a minimum measured delay of the plurality of packets received within the specified window, a sample-maximum filter configured to generate an estimate of the master clock phase utilizing selected packets each of which exhibits a maximum measured delay of the plurality of packets received within the specified window, and a sample-mean filter configured to generate an estimate of the master clock phase utilizing a mean of measured delays of multiple ones of the plurality of packets received within the specified window. Other types and arrangements of filters may be used in alternative embodiments.

Advantageously, the illustrative embodiments can provide significantly improved performance in frequency synchronization relative to the conventional techniques previously described.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for frequency synchronization in such systems. It should be understood, however, that the invention is not limited to use with the particular types of communication systems and frequency synchronization processes disclosed.

The invention can be implemented in a wide variety of other communication systems, using alternative processing circuitry arrangements and process steps. For example, although illustrated in the context of a communication system involving synchronization of master and slave devices communicating over an asynchronous packet network, the disclosed techniques can be adapted in a straightforward manner to a variety of other types of communication systems, including cellular systems, WiMAX systems, Wi-Fi systems, multiple-input multiple-output (MIMO) wireless systems, etc.

Figure 1:
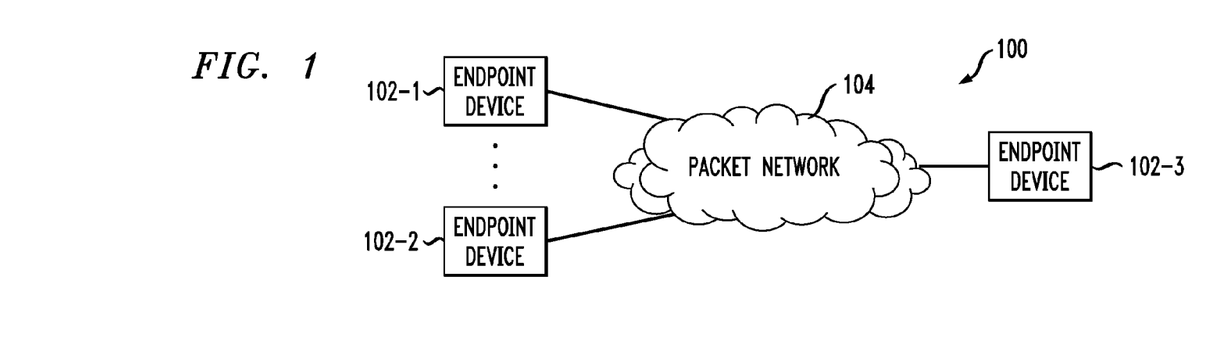
FIG. 1 is a block diagram of a communication system in an illustrative embodiment of the invention.

FIG. 1 shows a communication system 100 comprising a plurality of endpoint devices 102-1, 102-2 and 102-3 coupled to a packet network 104. A given endpoint device may comprise, for example, a computer, a wireless service base station, a mobile telephone, or any other type of communication device. One or more of the endpoint devices 102 are configured to incorporate a frequency synchronization functionality using a clock recovery loop as will be described in greater detail below. The particular number of endpoint devices shown in FIG. 1 is illustrative only and a given implementation may include more or fewer such devices. The packet network 104 is assumed to be an asynchronous packet network such as an Ethernet network. The network may or may not support QoS assignments. It may additionally or alternatively comprise other types of networks, in any combination.

Figure 2:
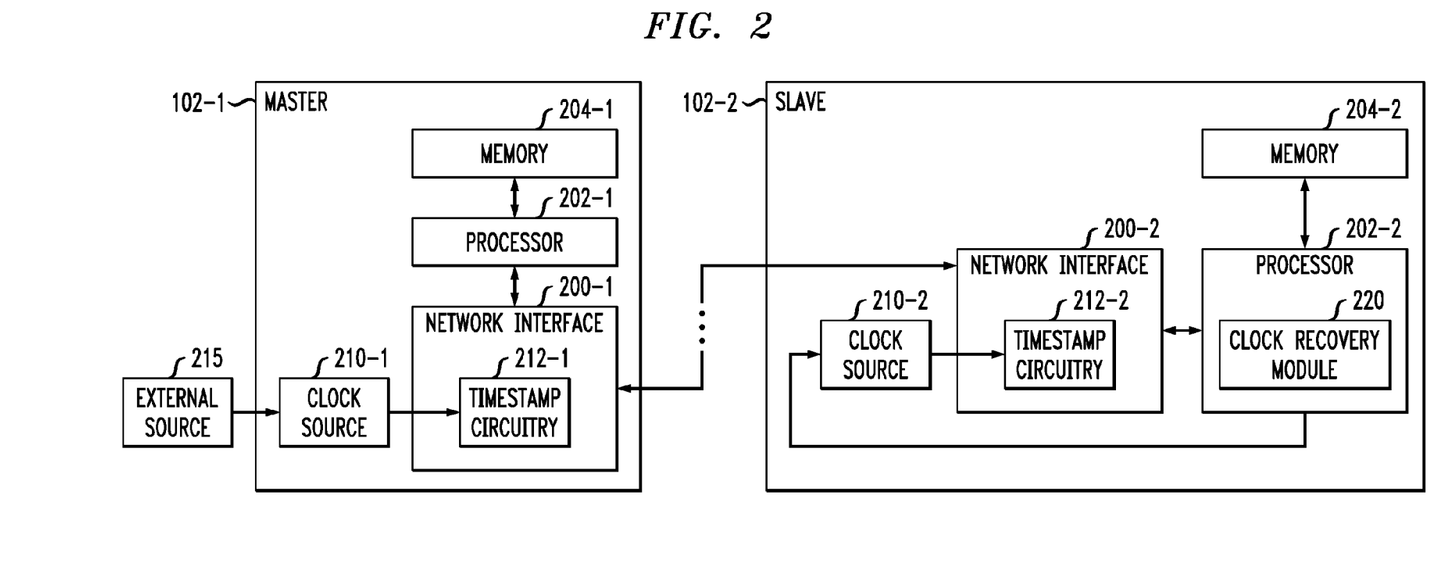
FIG. 2 shows a more detailed view of first and second communication devices in one possible implementation of the FIG. 1 system.

Frequency synchronization in the present embodiment is carried out between a pair of endpoint devices 102, one of which is designated as a master device and the other which is designated as a slave device. FIG. 2 shows a more detailed view of a given pair of endpoint devices 102-1 and 102-2 which are illustratively designated as master and slave, respectively. It should be noted that these designations are arbitrary, and a given endpoint device may operate as a master in one synchronization process and a slave in another synchronization process. Also, a given endpoint device may serve as a master device relative to multiple slave devices. For example, endpoint device 102-1 may be designated as a master device with reference to slave device 102-2 and may also serve as a master device relative to another endpoint device such as device 102-3. In this case, the two slave devices 102-2 and 102-3 share the same master device. Master-slave pairs therefore need not be exclusive pairs. Accordingly, each endpoint device 102 may incorporate both master and slave functionality, with the particular functionality being selectable at run time. It is also possible that a particular endpoint device may include only master functionality or only slave functionality.

Each of the endpoint devices 102 as shown in FIG. 2 includes a network interface 200, a processor 202 coupled to the network interface, a memory 204 coupled to the processor, and a clock source 210 coupled to timestamp circuitry 212 of the network interface. The clock source 210 may comprise, for example, a local oscillator (LO). The reference numerals associated with these elements in FIG. 2 are further denoted with a dash number that denotes the particular endpoint device 102-1 or 102-2 in which the elements are implemented.

The endpoint devices 102-1 and 102-2 communicate with one another over the packet network 104 via their respective network interfaces 200. This communication may be via one or more intermediate communication devices, such as gateways, routers, switches or other network elements, internal to the packet network 104. The timestamp circuitry 212 of the network interfaces 200 generates timestamps for packets sent and received over the interfaces. Each of the network interfaces may include additional hardware elements not explicitly shown in the figure, such as transceivers, packet parsing circuitry, packet generation circuitry, packet editing circuitry, etc.

The clock source 210-1 of the master endpoint device 102-1 is coupled to an external source 215 which may comprise a SONET/SDH, BITS or GPS clock source or any other type of external clock source. The external clock source is typically, but not necessarily, traceable to a primary reference source such as an atomic clock. In other embodiments, the master endpoint device could be based on a free-running clock, which may itself be a primary reference clock such as an atomic clock, in which case the external source may be eliminated.

The slave endpoint device 102-2 comprises a clock recovery module 220 that is illustratively shown as being implemented by the processor 202-2. The clock recovery module comprises a clock recovery loop, detailed examples of which will be described below in conjunction with FIGS. 4A and 4B. In this particular embodiment, the clock recovery module is assumed to be implemented primarily in the form of software that is executed by the processor. Instruction code associated with such software may be stored in the memory 204-2, which is an example of what is more generally referred to herein as a "processor-readable storage medium." In other embodiments, the clock recovery module, or particular portions thereof, may be implemented primarily in hardware that resides outside of the processor, or in various combinations of hardware, firmware and software.

Although shown as separate elements in FIG. 2, the clock recovery module 220 may comprise clock source 210-2 as an internal element thereof. As will be described below, at least a portion of the clock source is generally arranged within a clock recovery loop, all other elements of which may be implemented primarily using processor 202-2. For example, one or more such elements may be implemented in the form of signal processing circuitry, logic circuitry or other hardware circuitry of the processor 202-2. It is also possible that clock source 210-2 or portions thereof may be arranged internal to processor 202-2. Accordingly, the particular arrangement shown in FIG. 2 should be considered an illustrative example, and not limiting in any way.

Although illustrated using endpoint devices 102, the frequency synchronization techniques disclosed herein can additionally or alternatively be implemented in one or more communication devices that are internal to the packet network 104.

As indicated above, each of the endpoint devices 102 may be viewed as an example of a communication device. This term as used herein is intended to be construed broadly, so as to encompass, by way of example and without limitation, any arrangement involving the exchange of information between two elements of a system without regard to the particular application, medium, etc. Accordingly, a device which is utilized, for example, in the exchange of data between two boards connected over a backplane is considered a communication device as that term is used herein.

A communication device in accordance with the invention may be implemented in the form of one or more integrated circuits. For example, in one possible implementation, the communication device may comprise a single application-specific integrated circuit (ASIC) which includes at least a processor, a memory and a network interface. As another example, the processor and memory may be on one integrated circuit, and the network interface on another.

Numerous other single or multiple integrated circuit arrangements may be used in implementing the invention, and all such arrangements are intended to be encompassed by the general term "communication device" as used herein. A given such communication device can also be implemented at least in part using reconfigurable hardware, such as a field-programmable gate array (FPGA).

Figure 3:
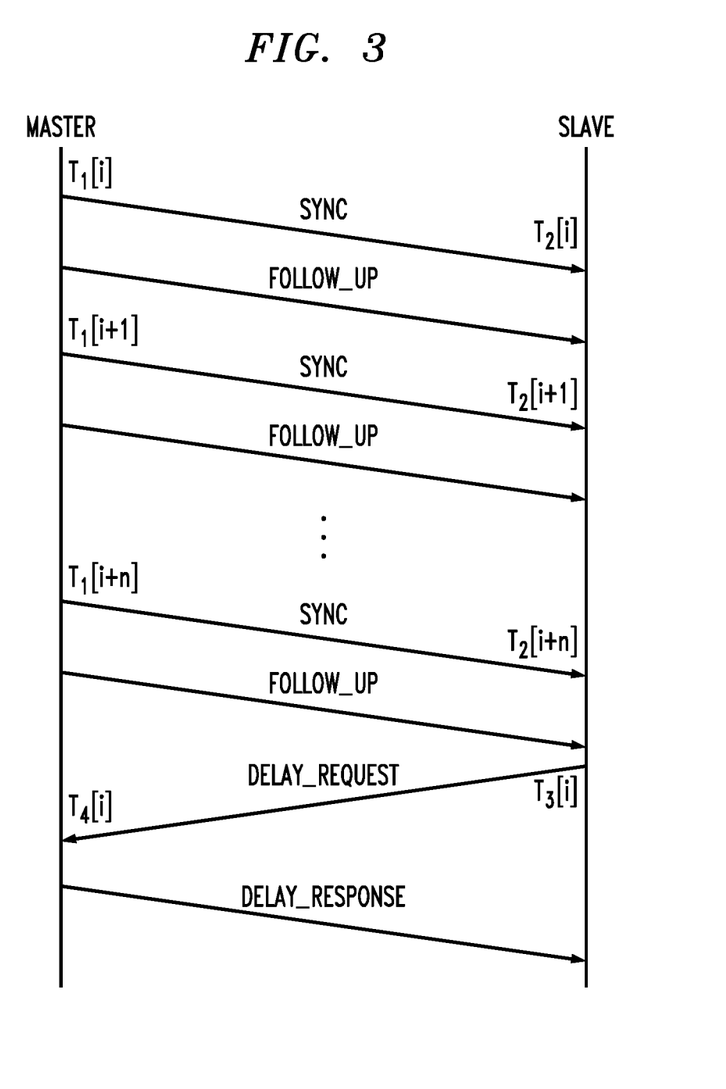
FIG. 3 illustrates a communication protocol that may be carried out between the first and second communication devices of FIG. 2.

FIG. 3 shows exemplary timing messages that may be exchanged between the master and slave endpoint devices 102-1 and 102-2 in an embodiment of the invention. The messages in this embodiment are compliant with the Precision Time Protocol (PTP) described in IEEE Draft P1588/D2.2, "Draft standard for a precision clock synchronization protocol for networked measurement and control systems," December 2007, which is incorporated by reference herein. This protocol is also commonly referred to as the IEEE1588v2 protocol. The corresponding timing messages are sent in the form of packets, although other types of timing messages may be used in implementing the invention. It is to be appreciated that the present invention does not require the use of the IEEE1588v2 protocol, and can be implemented using other protocols, as will be described below.

In accordance with the IEEE1588v2 protocol, the master device 102-1 periodically sends SYNC and possibly FOLLOW_UP messages to the slave device 102-2 as shown. A departure timestamp $T_1$ is generated by the timestamp circuitry 212-1 of the master device each time that device sends a SYNC message. When a given SYNC message is received by the slave device, its timestamp circuitry 212-2 generates a corresponding arrival timestamp $T_2$. The slave device can read the timestamp $T_1$ either directly from the given SYNC message or from the associated FOLLOW_UP message. The latter is an optional feature that exists to facilitate master device implementations in which hardware cannot directly edit the timestamp while the packet transmission is in progress. The slave device generates a DELAY_REQUEST message and its departure timestamp $T_3$. Arrival timestamp $T_4$ is recorded at the master device and sent back to the slave device in a DELAY_RESPONSE message.

Particular timing messages in the protocol as illustrated in FIG. 3 are further identified using a sequence number or index. Thus, the timestamps $T_1$ and $T_2$ associated with SYNC message i are denoted $T_1[i]$ and $T_2[i]$, respectively. Similarly, the timestamps associated with DELAY_REQUEST message i are denoted $T_3[i]$ and $T_4[i]$, respectively.

The timestamps $T_1$ and $T_4$ are generated with reference to the clock 210-1 of the master device 102-1, while the timestamps $T_2$ and $T_3$ are generated with reference to the clock 210-2 of the slave device 102-2. Hence, these timestamps can be processed to yield a phase error estimate. As will be described, this phase error estimate is utilized in the clock recovery loop of FIG. 4A.

It should be understood that although the description of the invention that follows will refer to SYNC messages of the PTP protocol and thus imply the use of $T_1$ and $T_2$ timestamps, all aspects of the present invention are applicable if the DELAY_REQUEST (and the associated DELAY_RESPONSE) messages are used instead (i.e., timestamps $T_3$ and $T_4$ are used instead of $T_1$ and $T_2$). It should also be apparent to those skilled in the art that the use of FOLLOW_UP messages does not change any aspect of the present invention.

It should again be noted that the present invention does not require the use of PTP, and can be implemented using a wide variety of other types of protocols designed for timing distribution. For example, the frequency synchronization techniques described herein can be adapted in a straightforward manner to utilize timing messages compliant with the Network Time Protocol (NTP) instead of PTP. NTP is described in D. L. Mills, "Network time protocol (version 3) specification, implementation and analysis," IETF RFC 1305, March 1992, which is incorporated by reference herein. Also, certain aspects of the invention can be adapted in a straightforward manner for use within an adaptive clocking system of a Circuit Emulation Service (CES), although the computational complexity may be an issue if too many CES flows concurrently exist in the network.

Figure 4A:
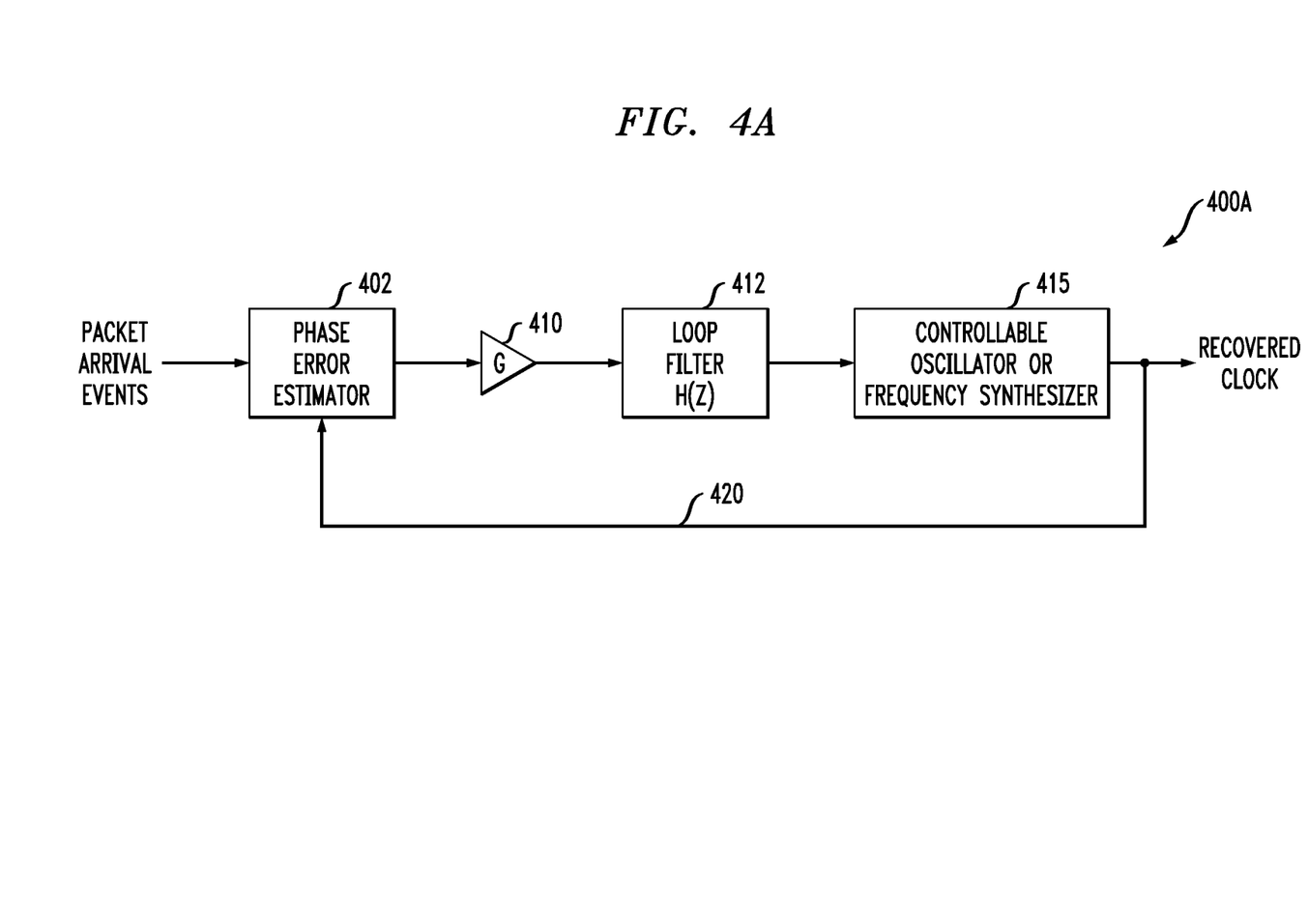
FIG. 4A is a block diagram of an illustrative embodiment of a clock recovery loop implemented in a given one of the communication devices of FIG. 2.

FIG. 4A shows a clock recovery loop 400A that is implemented primarily in the clock recovery module 220 of the slave endpoint device 102-2 in an illustrative embodiment. The clock recovery loop 400A includes a phase error estimator 402, a gain stage 410, a loop filter 412, and a controllable oscillator or frequency synthesizer 415. A recovered clock generated as an output of the clock recovery loop 400A is fed back to the phase error estimator 402 via feedback path 420 as indicated.

Generally, substantially all elements of the clock recovery loop 400A are implemented in clock recovery module 220 in the present embodiment, with the possible exception of the controllable oscillator or frequency synthesizer 415 which is associated with the slave device clock source 210-2. However, the term "clock recovery module" as used herein is intended to be more broadly construed, and may encompass at least a portion of controllable oscillator or frequency synthesizer 415, or other type of slave device clock source. Thus, as indicated previously, the clock recovery module may alternatively be viewed as comprising clock source 210-2 as an internal element of the module. Also, the term "clock recovery loop" as used herein is intended to be broadly construed to encompass a grouping of elements comprising substantially all loop elements other than a clock source that is controlled by the loop. It is to be appreciated that a clock recovery loop is utilized to control an associated clock source that is inserted within the loop.

Incoming packet arrival events, which may comprise received SYNC messages or other types of timing messages, are applied as inputs to the phase error estimator 402. The phase error estimator 402 uses these received timing messages and the recovered clock fed back from the output of the loop to generate an estimate of the error between the master device clock frequency and the slave device clock frequency. Timing information may be contained both in the packet content (e.g., a departure timestamp) and the event that signifies the packet arrival.

The controllable oscillator or frequency synthesizer 415 may be implemented, for example, as a voltage controlled oscillator (VCO) or other type of controllable local oscillator (LO). Alternatively, it may be implemented as a frequency synthesizer such as a circuit performing direct digital synthesis (DDS) based on a free-running local reference or any other component that allows an output frequency to be synthesized based on numerical information produced by the loop filter 412. The controllable oscillator or frequency synthesizer 415 may be viewed as an example of what is more generally referred to herein as a slave device clock source, or may comprise a portion of such a slave device clock source. Element 415 is also generally referred to herein as a controllable clock source. Although this element will also be more specifically referred to herein in certain contexts as simply an "oscillator," it should be understood that any of a variety of other clock sources may be used in implementing a given embodiment of the invention.

The clock recovery loop 400A in the present embodiment is generally configured as a phase-locked loop (PLL) operative to control a slave clock frequency of the slave endpoint device 102-2 based on a phase error estimate generated by the phase error estimator 402 so as to synchronize the slave clock frequency with a master clock frequency of the master endpoint device 102-1. As indicated previously, the phase error estimator 402 processes timestamps such as those described in conjunction with FIG. 3 in order to generate the phase error estimate. The PLL utilizes the phase error estimate to control an output frequency of oscillator 415 which is assumed to be implemented in the clock source 210-2 of the slave endpoint device.

The timing messages that traverse the packet network 104 between master endpoint device 102-1 and slave endpoint device 102-2 are subject to packet delay variation (PDV). As noted above, PDV is a dominant source of noise in packet-based communication systems. Conventional systems often use sample-minimum filtering in an attempt to minimize the impact of PDV, but such filtering leads to sub-optimal results in many types of networks and under varying traffic patterns. See I. Hadzic et al., "On Packet Selection Criteria for Clock Recovery," International IEEE Symposium on Precision Clock Synchronization (ISPCS) for Measurement, Control and Communication, October 2009, pp. 35-40.

As will be described below in conjunction with FIGS. 5 and 6, the phase error estimator 402 of FIG. 4A is advantageously configured to incorporate multiple filters each generating a different estimate of master clock phase, with control logic to adaptively select a particular one of those filters so as to minimize phase noise in the presence of changing traffic patterns and other network conditions.

Figure 4B:
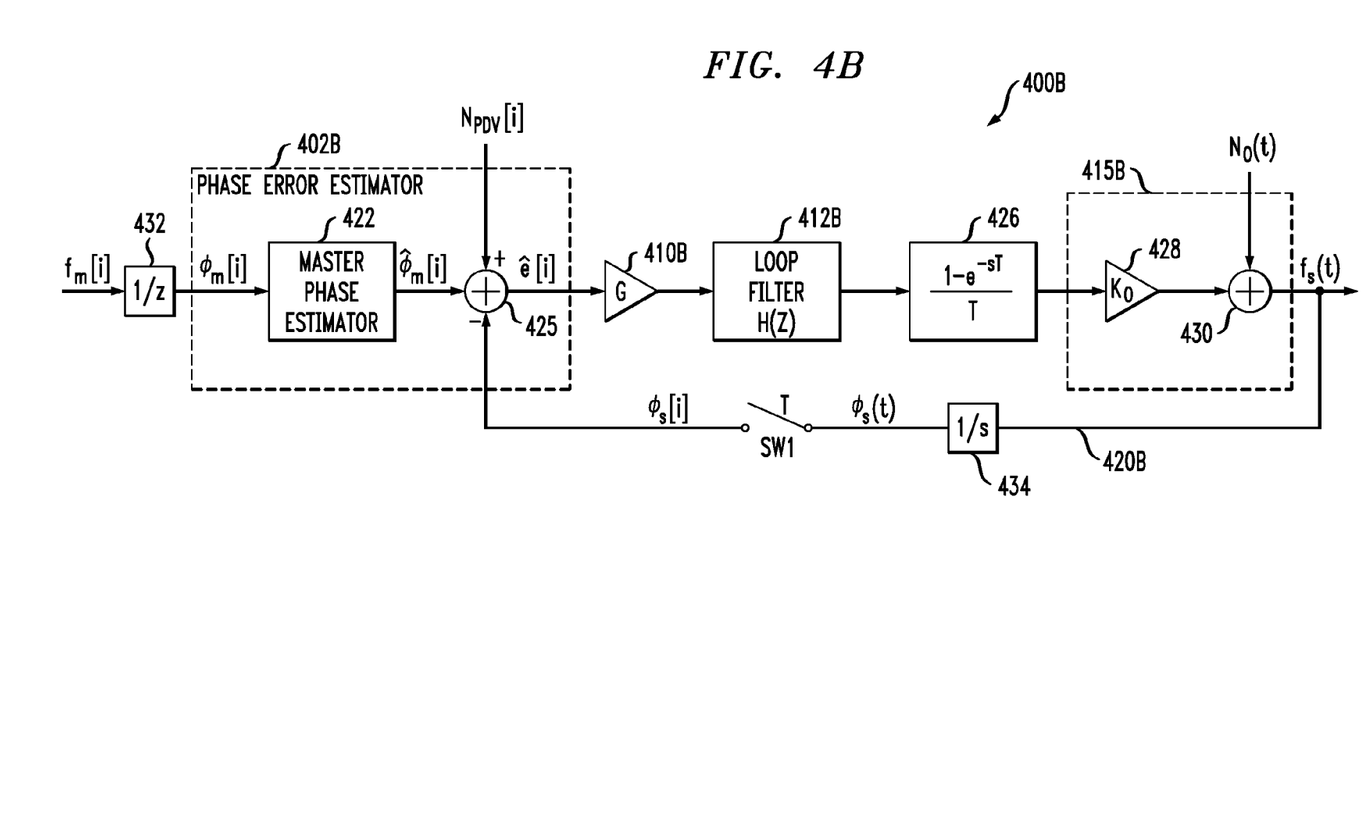
FIG. 4B is a mathematical model of the clock recovery loop of FIG. 4A.

FIG. 4B shows an exemplary mathematical model 400B of the clock recovery loop 400A of FIG. 4A. Elements present in the clock recovery loop 400A that are also present in the mathematical model are denoted in FIG. 4B using similar reference numerals. Thus, phase error estimator 402, gain stage 410, loop filter 412, controllable clock source 415 and feedback path 420 of FIG. 4A are denoted as corresponding elements 402B, 410B, 412B, 415B and 420B in FIG. 4B. The mathematical model also shows a number of additional elements, as will be described in greater detail below. It is to be appreciated that these additional elements need not be present in a given physical implementation of the clock recovery loop, but are instead illustrated in order to capture physical processes in the system and to facilitate an understanding of the operation of the loop. However, the model is also in the form of a clock recovery loop, and various elements thereof not shown in FIG. 4A may be present in a given embodiment of the invention. The above-noted physical processes captured by the model may be an artifact of how components interact or they may be unwanted processes. For example, because the phase error is calculated by subtracting two timestamps that are referenced to the master clock and the slave clock, respectively, and because T2 timestamps are subject to PDV noise, the model includes a signal combiner 425 that sums the master clock phase and PDV noise and subtracts the slave clock phase. This particular signal combiner need not be present in a given physical implementation of the loop, but is shown in the mathematical model to capture the corresponding physical process in the system.

The phase error estimator 402B is modeled in this example as a series combination of a master phase error estimator 422 and the above-noted signal combiner 425. Noise attributable to PDV of the received timing messages is modeled as an additive signal $N_{PDV}[i]$ applied to an input of the signal combiner 425.

A phase error estimate ê[i] generated by the phase error estimator 402B is fed into the gain stage 410B and the loop filter 412B. Since packet arrivals events are discrete events, the clock recovery loop up to the output of the loop filter 412B is modeled as a discrete-time system. However, the oscillator 415B is a continuous-time block, so the transition from the discrete-time domain to the continuous-time domain is modeled in FIG. 4B using a zero-order hold block 426. More specifically, when the loop filter 412B produces an output, the signal value is held constant until the next packet arrives causing the loop to produce the next update. The oscillator 415B is modeled as a linear gain 428 to whose output the local drift and wander are added through a signal combiner 430.

As the phase error estimator 402B is a discrete-time element triggered by packet arrival events, the transition from the continuous-time domain at the loop output back into the discrete-time domain is modeled by sampling switch SW1 in feedback path 420B. The switch SW1 is thus a mathematical representation of the fact that the frequency at the output of the clock recovery loop changes continuously but is only observed by the phase error estimator 402B when a given packet arrives.

We denote as $f_m[i]$ and $f_s[i]$ the respective clock frequencies of the master and slave devices 102-1 and 102-2. As indicated above, the clock recovery loop 400A is generally configured to synchronize the slave frequency $f_s[i]$ with the master frequency $f_m[i]$. The corresponding master and slave clock phases are denoted $\phi_m[i]$ and $\phi_s[i]$, respectively. The master clock phase $\phi_m[i]$ is applied to an input of the phase error estimator 402B and is generated from the master clock frequency $f_m[i]$ using discrete-time integrator element 432. Alternatively, the corresponding continuous master frequency signal $f_s(t)$ may be subject to a continuous-time integration operation to produce $\phi_m(t)$ which is sampled by a switch to yield the discrete master clock phase $\phi_m[i]$. Similarly, continuous-time integrator element 434 arranged prior to switch SW1 converts continuous slave frequency signal $f_c(t)$ to a corresponding continuous slave phase signal $\phi_s(t)$.

It should again be emphasized that certain components of the mathematical model need not be present in a corresponding physical system. For example, the integrator element may be viewed as a mathematical representation of a physical process, namely a timestamp counter that continuously progresses. Also, the switch SW1 is a mathematical representation of the fact that the system snapshots a timestamp at discrete time intervals.

The first timestamp is carried in the payload of the SYNC message and is generated with reference to the master device clock 210-1. The second timestamp is generated at the SYNC message arrival with reference to the slave device clock 210-2. These first and second timestamps correspond generally to PTP timestamps $T_1$ and $T_2$ as previously described in conjunction with FIG. 3.

The clock recovery loop 400A may be generally viewed as providing a feedback control system configured to track the master device clock frequency as accurately as possible in the face of various sources of disturbance. On each SYNC message arrival, the phase error estimator 402 produces a sample and the loop code executes. Hence, the system is natively discrete with a variable sample rate that averages the SYNC message arrival rate. Once the oscillator update is calculated, it is used to drive the oscillator 415 until the next packet arrival, which is modeled in FIG. 4B with the zero-order hold 426. The output frequency $f_s(t)$ is a continuous signal and its corresponding phase $\phi_s(t)$ is sampled on the next packet arrival. As indicated previously, this is modeled in FIG. 4B by the switch SW1 which samples $\phi_s(t)$ in the feedback path 422B to produce the discrete-time phase $\phi_s[i]$. The loop gain in the model 400B is the product of the oscillator constant $K_o$ associated with element 428 and the gain G of gain stage 410B. The first and dominant form of disturbance is the PDV noise modeled as $N_{PDV}[i]$ in FIG. 4B. The noise $N_O(t)$ of the oscillator 415B is inserted after the loop filter 412B via signal combiner 430 and thus is suppressed proportionally to the loop gain. The noise $N_O(t)$ represents an aggregate of disturbances that impact the oscillator, such as thermal noise, temperature wander and systematic drift due to aging.

Figure 5:
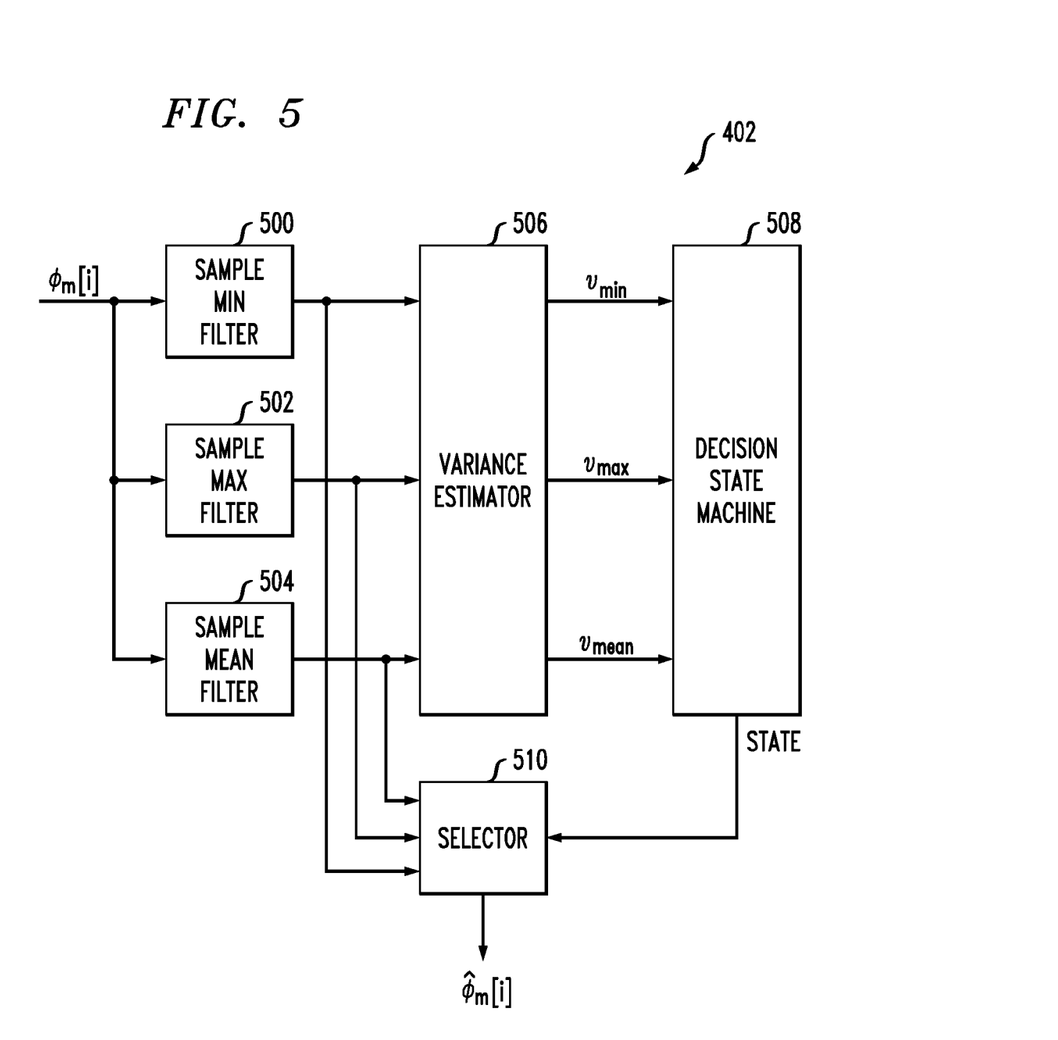
FIG. 5 shows a more detailed view of a phase error estimator implemented in the clock recovery loop of FIGS. 4A and 4B.

Referring now to FIG. 5, a more detailed view of the phase error estimator 402 of clock recovery loop 400A is shown. The phase error estimator 402 in this embodiment includes a sample-minimum filter 500, a sample-maximum filter 502 and a sample-mean filter 504, each of which is configured to generate a different estimate of the master clock phase $\phi_m[i]$. The sample-minimum filter 500 is utilized to generate an estimate of the master clock phase based on selected packets each of which exhibits a minimum measured delay of a group of packets received within a specified window. Similarly, the sample-maximum filter 502 is utilized in generating an estimate of the master clock phase based on selected packets each of which exhibits a maximum measured delay of the group of packets received within the specified window, and the sample-mean filter 504 is utilized to generate an estimate of the master clock phase based on a mean of measured delays of the group of packets received within the specified window. The window may be specified, for example, in terms of a particular number of packets, or as a particular period of time.

The filters 500, 502 and 504 in the present embodiment are not themselves phase estimators, in that these filters alone do not generate phase estimates. Instead, the basic phase estimation operation in this embodiment is implemented by subtracting timestamps T1 from T2. The filters serve to reduce or eliminate the noise in the process of generating phase estimates that are calculated by subtracting the timestamps.

It should also be noted that the sample-minimum, sample-maximum and sample-mean filters used in the FIG. 5 embodiment are presented by way of illustrative example only, and a wide variety of other types of filters may be used in alternative embodiments. Such filters will typically each implement a predetermined function of measured delays of the packets received within the specified window, with minimum, maximum and mean being examples of predetermined functions. In one possible alternative embodiment, the sample-mean filter 504 may be replaced with a sample-median filter. The term "filter" as used herein is intended to be construed broadly, and can encompass packet selection arrangements implemented in hardware, software or firmware, or combinations thereof.

The phase error estimator 402 further includes a variance estimator 506, a decision state machine 508, and a selector 510. These elements may be collectively viewed as an example of what is more generally referred to herein as "control logic." The variance estimator 506 generates phase error variance measures for respective ones of the master clock phase estimates, in a manner to be described in greater detail below. The state machine 508 receives these variance measures from the variance estimator 506, and provides a state signal to the selector 510 to select the master clock phase estimate from a particular one of the filters 500, 502 and 504 based on the variance measures. The state machine 508 has states corresponding to respective ones of the filters 500, 502 and 504, and movement from state to state in the state machine is based on characteristics of the corresponding master clock phase estimates. Adaptive selection of one of the filters 500, 502 and 504 and its associated master clock phase estimate is based upon the current state of the state machine 508, as reflected in the state signal applied to the selector 510. For example, adaptive selection of a particular one of the filters for use in generating the phase error estimate to be provided to the clock recovery loop may be based on which of the master clock phase estimates has the lowest associated phase noise based on the variance measures.

The operation of the phase error estimator 402 of FIG. 5 will now be described in greater detail. As indicated above, the output of a given filter of the phase error estimator for a particular sampling window can be the delay of a single selected packet (e.g., sample-minimum or sample-maximum) or a delay that is the result of some mathematical operation on multiple packet delays (e.g., sample-mean or sample-median). Again, the delay in this illustrative embodiment is estimated by subtracting the T1 and T2 timestamps.

Let $x_n$ be a nonnegative real number representing the delay of the n th timing packet through the packet network 104 and let $$X_k = [x_n, kW \leq n \leq (k+1)W-1], \quad (1)$$

be a vector representing delays of the packets within the k th window of size W. Thus, for the k th window, the filter output is given by $$y_k = g(X_k), \quad (2)$$

where g denotes a general operator on a set defined by Equation (1). In the absence of PDV, all of the $x_i$ values are equal to a single constant value x, and it is desired that in this case, $y_k = x$, as well. An optimal operator may then be defined as one that minimizes the variance of $y_k$, subject to this constraint. One example of such an operator is based on the scaled $L_p$ norm:

$$g_p(X_k) = \left[ \frac{1}{W} \sum_{n=kW}^{(k+1)W-1} x_n^p \right]^{1/p} \quad (3)$$

where p is any real number, and where the absolute value signs normally used in the $L_p$ noun are omitted because we have assumed nonnegative components. This scaled $L_p$ noun operator encompasses the following three special cases for $p = -\infty$, $p = \infty$, and $p = 1$, which correspond to sample-minimum filtering, sample-maximum filtering and sample-mean filtering, respectively:

$$g_{-\infty}(X_k) = \min_{n=kW}^{(k+1)W-1} x_n, \quad (4)$$

$$g_{+\infty}(X_k) = \max_{n=kW}^{(k+1)W-1} x_n, \quad (5)$$

$$g_1(X_k) = \frac{1}{W} \sum_{n=kW}^{(k+1)W-1} x_n. \quad (6)$$

Note that in the limiting cases, $$W^{-1/p} \xrightarrow[p \to \infty]{} 1.$$

The sample-minimum, sample-maximum and sample-mean operators in Equations (4), (5) and (6), respectively, can be computed in an efficient manner, and it is also possible to estimate their theoretical statistical performance. As an example, we consider network delays which are characterized by the class of Erlang variates with probability density $$f_X(x) = \frac{\lambda^m x^{m-1} e^{-\lambda x}}{(m-1)!}, x \geq 0 \quad (7)$$

where m is the order and λ is the traffic rate. We can extend this class by also including mirrored-Erlang densities, which are defined as $f_x(-x)$ and denoted by specifying negative values for the order m. We have found that for network delays characterized by these particular probability densities, and using the sample-minimum, sample-maximum and sample-mean filtering of Equations (4), (5) and (6), the best performance is obtained using different types of filtering for different values of m, and more specifically sample-minimum for $1 \leq m \leq 3$, sample-maximum for $-3 \leq m \leq -1$, and sample-mean for $|m| > 3$.

One could also, more generally, seek the optimal operator in the $L_p$ class:

$$\min_p \text{var}[g_p(X_k)] = \min_p [E\{g_p^2(X_k)\} - E^2\{g_p(X_k)\}] \quad (8)$$

optimizing over arbitrary values of p. However, for the extended class of Erlang distributions described above, we have found that no significant advantage is achieved beyond that provided by the sample-minimum, sample-maximum and sample-mean arrangement (i.e., $p=-\infty,+\infty,1$). Nonetheless, as indicated previously, alternative embodiments of the invention can utilize filters other than the sample-minimum, sample-maximum and sample-mean filters 500, 502 and 504 of FIG. 5. These filters can of course include filters that are based on operators other than the particular exemplary $L_p$-based operators described above. An advantage of the sample-minimum, sample-maximum and sample-mean filters of the illustrative FIG. 5 embodiment is that the associated computations are simple and can therefore be performed in real time as packets arrive.

The phase error estimate ê[i] at the output of the phase error estimator 402B in FIG. 4B when determined using the output of the sample-minimum filter 500 for the k th window is more specifically given by $$\hat{\phi}_e^{min}[k] = g_{-\infty}(X_k) - x_0, \quad (9)$$

where superscript "min" indicates that it is based on the sample-minimum operator. The packet propagation times $x_n$ (i.e., the elements of vector $X_k$) may be calculated by subtracting the departure timestamp from the arrival timestamp:

$$x_n = T_2[n] - T_1[n]. \quad (10)$$

The first packet observed at startup time is called the reference packet and its propagation time is $x_0 = T_2[0] - T_1[0]$. Thus, phase error when using the sample-minimum filter may be calculated as follows:

$$\hat{\phi}_e^{min}[k] = \min_{n=kW}^{(k+1)W-1} \{T_2[n] - T_1[n]\} - (T_2[0] - T_1[0]). \quad (11)$$

It can be shown that, for a slowly changing phase error, the phase error estimate in Equation (9) is the sum of the actual phase error and phase noise that is a sample-minimum filtered version of the PDV, that is $$\hat{\phi}_e^{min}[k] \approx \phi_e[kW] + \min_{n=kW}^{(k+1)W-1} \{T_{ms}[n] - T_{ms}[0]\}, \quad (12)$$

where $T_{ms}[n]$ is the master-to-slave propagation time of the n th packet and $T_{ms}[0]$ is the master-to-slave propagation time of the reference packet.

Analogous relationships can be derived for phase error estimates generated using the sample-maximum and sample-mean filters. A system based on the sample-maximum filter calculates the phase error as $$\hat{\phi}_e^{max}[k] = g_{+\infty}(X_k) - x_0, \quad (13)$$

which expressed in terms of a phase error and noise component is $$\hat{\phi}_e^{max}[k] \approx \phi_e[kW] + \max_{n=kW}^{(k+1)W-1} \{T_{ms}[n] - T_{ms}[0]\}, \quad (14)$$

while for a system based on the sample-mean filter the equations are $$\hat{\phi}_e^{mean}[k] = g_1(X_k) - x_0, \text{ and} \quad (15)$$

$$\hat{\phi}_e^{mean}[k] \approx \phi_e[kW] + \frac{1}{W} \sum_{n=kW}^{(k+1)W-1} (T_{ms}[n] - T_{ms}[0]). \quad (16)$$

Note that the noise component exists only in the presence of variable delays: if the packet delays are constant, $T_{ms}[n]$ and $T_{ms}[0]$ cancel. Likewise, if packet delays consist of a constant component (i.e., bias) and a variable component, the noise amplitude only depends on the range of the variable component.

The phase error estimator 402 as shown in FIG. 5 may be configured to independently calculate the phase error estimate using each of the three available filters 500, 502 and 504. The variance estimator 506 then estimates the variances of the resulting signals, which are set forth in Equations (12), (14) and (16). The variance may be estimated using a sliding window of V most recent samples as $$v_p(k) = \frac{1}{V}\sum_{i=0}^{V-1} g_p^2(X_{k-i}) - \left[\frac{1}{V}\sum_{i=0}^{V-1} g_p(X_{k-i})\right]^2, \quad (17)$$

where delay vectors $X_{k-i}$, $0 \le i \le V-1$, are calculated by subtracting the departure timestamp from the arrival timestamp, and the operator $g_p(.)$, $p \in \{-\infty, 1, \infty\}$ is mathematically defined by Equation (3), although it may be simpler to use Equations (4) through (6). Hence, Equation (17) generates three signals, denoted $v_{min}(k)$, $v_{max}(k)$, and $v_{mean}(k)$, each representing the noise estimate of the corresponding filter output. These signals are shown in FIG. 5 as the inputs to the decision state machine 508.

Figure 6:
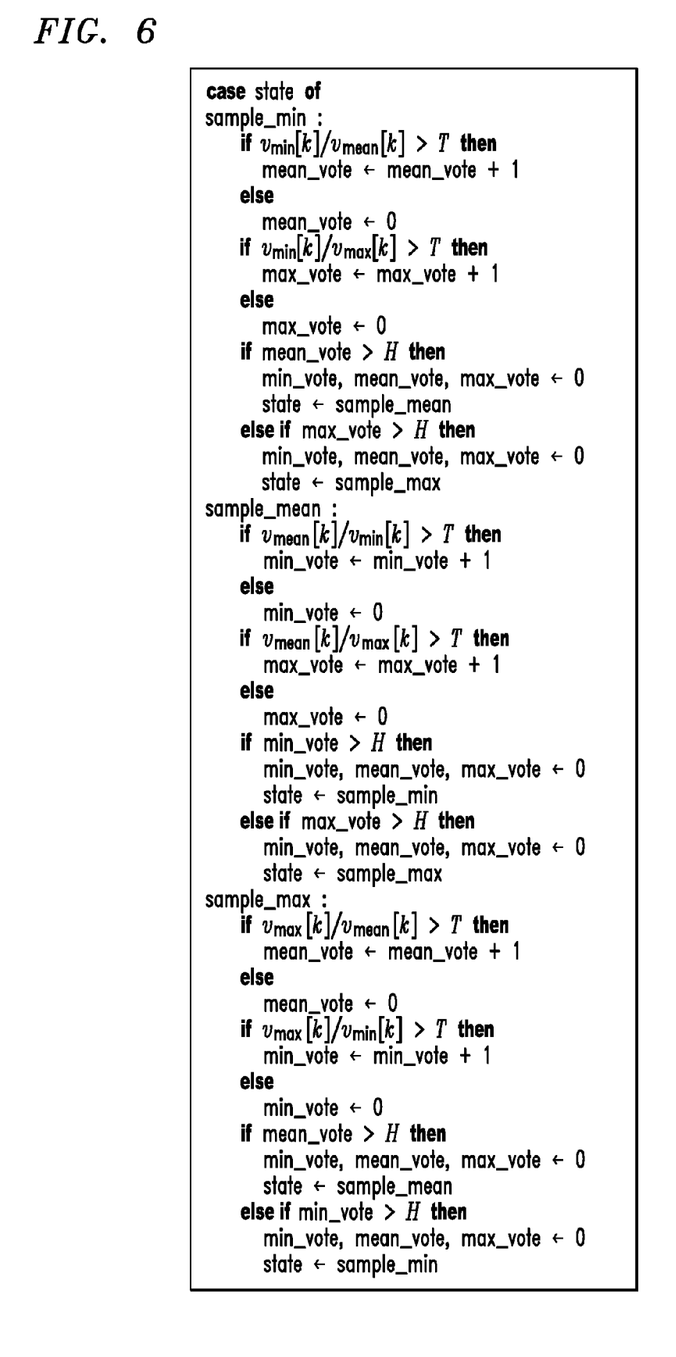
FIG. 6 shows an exemplary set of pseudocode for implementing a decision state machine in the phase error estimator of FIG. 5.

An example of a set of pseudocode for implementing the state machine 508 is shown in FIG. 6. The state machine includes three states, denoted sample_min, sample_max and sample_mean. From each of the states, the state can change to one of the two other states, based on vote counters denoted min_vote, max_vote and mean_vote. The vote counters are controlled using ratios of the variance measures generated by the variance estimator 506, as will be described in greater detail below. If the noise estimates are clearly separated, which may occur in the presence of static and infrequently-changing network conditions, selecting the filter associated with the lowest noise is straightforward. However, if the separation is not clear, that is if two noise estimates overlap in magnitude, or if the network load changes frequently, changing the filter too often can harm the overall system performance.

In order to better understand the source of the problem, consider a system in steady state using the sample-minimum filter 500 until the window $k=k_0$. Because the system comprises a PLL, it will converge such that the long-term mean of the phase error estimate in Equation (9) equals zero. Suppose that in the window $k=k_0+1$ the selected filter is switched to the sample-maximum filter 502. In other words, the system switches from using Equation (9) to Equation (13) for the phase error signal. Notice that the reference packet delay $x_0$ is a constant in both equations and, thus, can be taken outside the minimum or maximum operator. Between the two windows, the phase error differs by $$\hat{\varphi}_e^{max}[k_0+1] - \hat{\varphi}_e^{min}[k_0] = \max_{n=(k+1)W}^{(k+1)W-1}\{x_n\} - \min_{n=kW}^{(k+1)W-1}\{x_n\}. \quad (18)$$

Equation (18) above is likely to evaluate to a non-zero value for at least two reasons. First, different operators are used to yield the components of the expression. Second, the data in the k th window must have statistical properties different than the data in the (k+1)th window; otherwise the filter would not be changed in the first place. Hence, the overall phase error signal will be a step function, which is undesirable because it disturbs an otherwise stable output of the PLL.

To avoid a spurious step response of the type described above, one can reset the phase error signal to zero and establish a new reference packet each time the filter is changed. Assuming that the system is in steady state, the phase error is close to zero before the switch, so resetting it will result in little to no disturbance. However, if resets are too frequent, the feedback control action of the PLL will be hindered. In an extreme case, the system could be jumping rapidly back and forth between multiple packet selection criteria, holding the phase error signal at zero all the time, which would result in an open loop system. This issue is addressed in the FIG. 6 pseudocode by incorporating hysteresis as described below.

As indicated previously, the state machine 508 as shown in the FIG. 6 pseudocode has three states, each representing a currently active one of the packet filters 500, 502 and 504. It calculates the ratios between the noise that corresponds to the active filter and the noise that corresponds to the other two filters. For example, if the current state is the sample_min state, the calculated ratios are $v_{min}[k]/v_{mean}[k]$ and $v_{min}[k]/v_{max}[k]$. If both ratios are less than a configurable threshold T, the state machine takes no action. Otherwise, a vote in favor of a state transition is recorded. If both ratios are greater than the threshold, a vote for both transitions is recorded. The transition that reaches H consecutive votes determines the next state. If both possible transitions reach the required number of votes in the same iteration, static priorities are used to resolve the conflict, as detailed in the pseudocode. The threshold parameter T determines how significant the noise difference should be to even consider changing the filter. The parameter H determines the amount of hysteresis in the transition. In a given implementation, examples of suitable values may include T=4 and H=3, although other values could of course be used.

The clock recovery loop 400 comprising the phase error estimator 402 of FIG. 5 with the decision state machine shown in FIG. 6 significantly outperforms a conventional arrangement which utilizes only sample-minimum filtering. The adaptive packet selection process in this illustrative embodiment reduces the noise to a low enough level that the local oscillator wander dominates the recovered clock performance. In other words, the remaining wander in both cases is due to the PLL bandwidth, not the PDV.

Although in the above embodiments only one of the available filters is selected at any given time, other embodiments may generate the phase error estimate based on a combination of outputs of two or more of the available filters. For example, master clock phase error estimates from two or more of the filters may be combined in a weighted manner based on their respective variances. More specifically, an optimal weighted sum of the outputs of two of the filters may be formed as V2/(V1+V2)*E1+V1/(V1+V2)*E2 where E1 and E2 are the outputs of the two filters (e.g., sample-minimum and sample-maximum) and V1 and V2 are their respective variances. That will result in the minimum variance of the combined signal. A similar expression can be used to combine the outputs of all three of the filters.

It is also possible for the phase error estimate to be based on a combination of at least one master clock phase estimate generated for packet flow in a direction from the master device to the slave device and an additional master clock phase estimate generated for packet flow in a direction from the slave device to the master device. In such embodiment, the master-to-slave packet flow may comprise SYNC packets and the slave-to-master packet flow may comprise DELAY_REQUEST packets. The phase estimates for the two flows can be combined using a weighted sum. Each such packet flow may be processed using a different set of multiple filters (e.g., sample-minimum, sample-maximum and sample-mean filters). It would also be possible to switch between exclusive selection of a given one of the filters in the set and weighted combinations of multiple filter outputs, based on factors such as quality of the corresponding variance measures.

It should therefore again be emphasized that the above-described embodiments of the invention are intended to be illustrative only. As indicated previously, the invention is not restricted in terms of the particular configuration of the communication device in which it is implemented. Thus, a given communication device configured in accordance with the invention may include different arrangements of elements or other elements not explicitly shown or described. Also, alternative embodiments of the invention can utilize, for example, different communication system configurations, estimation and filtering processes, loop configurations, and timing messages than those described above in the context of the illustrative embodiments. As one particular instance, in an alternative embodiment, the variance measures used in the illustrative embodiments may be replaced with other types of signal quality measures derived from the timestamps. Furthermore, the particular assumptions made in the course of describing the illustrative embodiments should not be viewed as requirements, and such assumptions need not apply in alternative embodiments. These and numerous other alternative embodiments within the scope of the following claims will be readily apparent to those skilled in the art.

What is claimed is:

1. An apparatus comprising:
a communication device comprising a clock recovery loop having a phase error estimator;
the communication device being operative as a slave device relative to another communication device that is operative as a master device;
the clock recovery loop being configured to control a slave clock of the slave device responsive to a phase error estimate generated by the phase error estimator so as to synchronize the slave clock with a master clock of the master device;
the phase error estimator comprising a plurality of filters each configured to generate a different estimate of master clock phase using at least a subset of a plurality of packets received from the master device, and control logic for adaptively selecting at least a particular one of the plurality of filters for use in generating the phase error estimate to be processed in the clock recovery loop.

2. The apparatus of claim 1 wherein a given one of the master clock phase estimates is determined based on measured master-to-slave delays associated with respective ones of the received packets in the corresponding subset.

3. The apparatus of claim 2 wherein the measured master-to-slave delay associated with a particular one of the received packets is computed based on a difference between an arrival timestamp generated in the slave device and a corresponding departure timestamp generated in the master device, wherein the departure timestamp is communicated from the master device to the slave device in the particular received packet.

4. The apparatus of claim 1 wherein a given one of the master clock phase estimates is determined based on measured slave-to-master delays associated with respective ones of the received packets in the corresponding subset.

5. The apparatus of claim 4 wherein the measured slave-to-master delay associated with a particular one of the received packets is computed based on a difference between a departure timestamp generated in the slave device and a corresponding arrival timestamp generated in the master device, wherein the arrival timestamp is communicated from the master device to the slave device in the particular received packet.

6. The apparatus of claim 1 wherein one of the plurality of filters generates an estimate of the master clock phase utilizing a predetermined function of measured delays of multiple ones of a plurality of packets received within a specified window.

7. The apparatus of claim 6 wherein one of the plurality of filters generates an estimate of the master clock phase utilizing selected packets each of which exhibits a minimum measured delay of the plurality of packets received within the specified window.

8. The apparatus of claim 6 wherein one of the plurality of filters generates an estimate of the master clock phase utilizing selected packets each of which exhibits a maximum measured delay of the plurality of packets received within the specified window.

9. The apparatus of claim 6 wherein one of the plurality of filters generates an estimate of the master clock phase utilizing a mean of measured delays of multiple ones of the plurality of packets received within the specified window.

10. The apparatus of claim 6 wherein the plurality of filters comprises:
a sample-minimum filter configured to generate an estimate of the master clock phase utilizing selected packets each of which exhibits a minimum measured delay of the plurality of packets received within the specified window;
a sample-maximum filter configured to generate an estimate of the master clock phase utilizing selected packets each of which exhibits a maximum measured delay of the plurality of packets received within the specified window; and
a sample-mean filter configured to generate an estimate of the master clock phase utilizing a mean of measured delays of multiple ones of the plurality of packets received within the specified window.

11. The apparatus of claim 1 wherein the control logic comprises a variance estimator configured to generate variance measures for respective ones of the master clock phase estimates, and wherein the control logic adaptively selects at least a particular one of the plurality of filters based on the variance measures.

12. The apparatus of claim 1 wherein the control logic comprises a state machine having states corresponding to respective ones of the filters with the adaptive selection of the particular one of the filters being based upon the current state of the state machine and wherein movement from state to state in the state machine is based on characteristics of the corresponding master clock phase estimates.

13. The apparatus of claim 12 wherein the characteristics of the master clock phase estimates comprise phase error variances.

14. The apparatus of claim 1 wherein the control logic adaptively selects a particular one of the plurality of filters for use in generating the phase error estimate to be provided to the clock recovery loop based on which of the master clock phase estimates has the lowest associated phase noise.

15. The apparatus of claim 1 wherein the phase error estimate is based on a combination of two or more of the master clock phase error estimates.

16. The apparatus of claim 15 wherein in generating the phase error estimate said two or more of the master clock phase error estimates are combined in a weighted manner based on their respective variances.

17. The apparatus of claim 1 wherein the phase error estimate is based on a combination of at least one master clock phase estimate provided by said selected at least one filter and an additional master clock phase estimate generated for packet flow in a direction from the slave device to the master device.

18. The apparatus of claim 1 wherein the communication device comprises a processor coupled to a memory, and the clock recovery loop is implemented at least in part in software code that is stored in the memory and executed by the processor.

19. The apparatus of claim 1 wherein the apparatus is implemented at least in part in the form of an integrated circuit.

20. A method for use in a communication device, the communication device being operative as a slave device relative to another communication device that is operative as a master device, the method comprising the steps of:
receiving packets from the master device;
generating an estimate of phase error between a master clock of the master device and a slave clock of the slave device; and
controlling the slave clock based on the phase error estimate to synchronize the slave clock with the master clock;
wherein the generating step comprises generating a plurality of different estimates of master clock phase with each such master clock phase estimate being based on at least a subset of the packets received from the master device, and adaptively selecting at least a particular one of the master clock phase estimates for use in generating the phase error estimate.

21. A computer program product comprising a processor-readable storage medium having embodied therein executable program code that when executed by a processor of the communication device implements the steps of the method of claim 20.

22. A communication system, comprising:
at least first and second communication devices configured to communicate with one another over a packet network;
a first one of the communication devices being operative as a slave device relative to another one of the communication devices operative as a master device;
the first communication device comprising a clock recovery loop having a phase error estimator;
the clock recovery loop being configured to control a slave clock of the slave device responsive to a phase error estimate generated by the phase error estimator so as to synchronize the slave clock with a master clock of the master device;
the phase error estimator comprising a plurality of filters each configured to generate a different estimate of master clock phase using at least a subset of a plurality of packets received from the master device, and control logic for adaptively selecting at least a particular one of the plurality of filters for use in generating the phase error estimate to be processed in the clock recovery loop.

23. The apparatus of claim 1 wherein the phase error estimator is configured to generate the phase error estimate based at least in part on one or more arrival and departure timestamps associated with respective ones of the received packets.

* * * * *